(12) United States Patent
Van Den Bogaert

(10) Patent No.: US 8,571,094 B2
(45) Date of Patent: Oct. 29, 2013

(54) NOISE MEASUREMENT METHOD AND A RELATED RECEIVING DIGITAL SUBSCRIBER LINE MODEM

(75) Inventor: Etienne André Hubert Van Den Bogaert, Pepingen (BE)

(73) Assignee: Alcatel Lucent, Paris (FR)

( * ) Notice: Subject to any disclaimer, the term of this patent is extended or adjusted under 35 U.S.C. 154(b) by 2388 days.

(21) Appl. No.: 11/302,267

(22) Filed: Dec. 14, 2005

(65) Prior Publication Data

US 2006/0126708 A1    Jun. 15, 2006

(30) Foreign Application Priority Data

Dec. 15, 2004 (EP) ..................................... 04292999

(51) Int. Cl.
*H04B 1/38* (2006.01)
(52) U.S. Cl.
USPC ......................................................... 375/222
(58) Field of Classification Search
USPC .......... 375/260, 219, 220, 222, 259; 702/181, 702/142; 382/193; 714/784; 370/282, 286, 370/289; 379/406.01, 406.05, 399.01
See application file for complete search history.

(56) References Cited

U.S. PATENT DOCUMENTS

| | | | |
|---|---|---|---|
| 3,845,466 A * | 10/1974 | Hong | 382/193 |
| 5,689,444 A * | 11/1997 | Jordan et al. | 702/142 |
| 6,108,373 A | 8/2000 | Fargues et al. | |
| 2003/0152157 A1 * | 8/2003 | Antoine et al. | 375/260 |
| 2003/0188254 A1 * | 10/2003 | Lusky et al. | 714/784 |
| 2003/0210749 A1 * | 11/2003 | Asjadi | 375/260 |
| 2004/0078168 A1 * | 4/2004 | Horch | 702/181 |
| 2005/0190800 A1 * | 9/2005 | Maltsev et al. | 370/914 |
| 2006/0083324 A1 * | 4/2006 | DesJardins et al. | 375/260 |

FOREIGN PATENT DOCUMENTS

GB    2 319 148    5/1998

OTHER PUBLICATIONS

Dr. Dennis J. Rauschmayer, "ADSL/VDSL Principles, A Practical and Precise Study of Asymmetric Digital Subscriber Lines and Very High Speed Digital Subscriber Lines", Chapter 6, p. 159.

* cited by examiner

*Primary Examiner* — Young T. Tse
(74) *Attorney, Agent, or Firm* — Harness, Dickey & Pierce

(57) ABSTRACT

A transmitting Digital Subscriber Line (DSL) modem is coupled over a communication line to the receiving DSL modem. A receiving DSL modem receives a symbol transmitted by the transmitting DSL modem. Subsequently the receiving DSL modem demaps the symbol received onto a constellation point. The receiving DSL modem then performs a noise measurement based on the difference between the received symbol and the determined constellation point. Further, the receiving DSL modem determines a frequency of the symbols incorrectly demapped and subsequently the receiving DSL modem corrects the noise measurement using the frequency of the symbols incorrectly demapped.

10 Claims, 3 Drawing Sheets

NOISE MEASUREMENT METHOD AND A RELATED RECEIVING DIGITAL SUBSCRIBER LINE MODEM

The present invention relates to a method for Noise measurement as described in the preamble of claim 1 and the related Receiving Digital Subscriber Line modem as described in the preamble of claim 6.

Such a method and related devices are already known in the art, e.g. from the handbook *ADSL/VDSL Principles, A practical and Precise Study of Asymmetric Digital Subscriber Lines and Very High Speed Digital Subscriber Lines*, from the author Dr. Dennis J. Rauschmayer, printed by Macmillan Technology Series, Chapter 6, page 159.

In such Digital Subscriber Line modems the transmission of data of a dataflow is done using Discrete Multi Tone and is based on quadrature amplitude modulation (QAM) wherein bits of the data flow are modulated on a carrier-signal comprising many tones. This modulation is done by mapping a number of bits of the dataflow as a single symbol on each tone of a plurality of tones of the carrier-signal. This number of bits at first is at transmission mapped as a symbol on a predetermined constellation point of a plurality of constellation points where each of the constellation points in FIG. 1 is presented as a dot. Subsequently, the constellation point whereon a symbol is mapped is used for modulating the symbol onto the carrier signal.

The number of bits that can be modulated as a single symbol on a single tone of the carrier-signal depends amongst others on the signal-to-noise ratio of the modulated signal.

This modulated data-signal comprising a plurality of tones carriers each tone carrying a symbol towards the receiver. The receiving modem at reception of the symbols modulated on the tones of the carrier-signal and transmitted by the transmitting modem, starts demodulating the received data-signal and subsequently performs the demapping, called mapping in the opposite direction, of such a received symbol onto a constellation point. The received symbol is demapped on the constellation point closest to the received symbol. Due to noise on the communication line the received symbol which is transmitted on a certain constellation point S1 is received within the decision area of an adjacent or possibly another constellation point S2 as presented in FIG. 1.

The QAM demodulation and demapping at the receiver is based on hard decisions and the process of corrupt symbol detection as shown in FIG. 1. After the decision for mapping the received symbol onto a certain constellation point is made, whether right or wrong, the distance between the received symbol and the constellation point whereon the received symbol is remapped is measured as noise. This means that the measured noise will never exceed the maximum noise distance within one decision region, which is $$\frac{\sqrt{2}}{2} \cdot d,$$

where d is the distance between two adjacent constellation points. The actual noise however is equal to the distance between the transmitted symbol S1 and the received point as shown in FIG. 1.

As a consequence, in case of a large noise increase causing an incorrect demapping of received symbols, the receiving modem will sense a smaller noise increase than the real noise increase.

For noise increase purposes a correction of the signal-to-noise ratio is done based on the measured value of the noise. Hence, the noise measurement is not sufficient for a stable modem connection An object of the present invention is to provide a noise measurement method of the above known type and a related system but wherein the noise measurement is improved.

According to the invention, this object is achieved by the Noise measurement method as described in claim 1, the Receiving Digital Subscriber Line modem as described in claim 6.

Indeed according to the invention, this object is achieved due to the fact that the receiving modem determines a frequency of the symbols incorrectly demapped, where this frequency of incorrect demapped symbols is proportional to the level of the noise and consequently the noise margin, and subsequently corrects the noise measurement using this frequency of the symbols incorrectly demapped.

Another characteristic feature of the present invention is described in claim 2 and claim 7.

The determination of the increased frequency is based on the determination of symbols received in an erasure zone. A symbol received in the erasure zone is a symbol received outside the area for demapping received symbols and hence indicating an error situation. The number of symbols received in the erasure zone, i.e. the number of incorrect demapped symbols, is used for correcting the noise Another characteristic feature of the present invention is described in claim 3 and claim 8.

The determination of the increased frequency of symbols incorrectly demapped is based on the receiving modem determining a deviation from a normal distribution of the measured noise on the received symbols. Where the deviation of the normal distribution increases, the noise level increases and consequently the noise margin decreases. In other words the deviation from the normal distribution is proportional to the noise level increase.

The correction of the noise measurement then can be made based on this frequency of measured incorrectly received symbols.

Another feature of the present invention is described in claim 4 and claim 9.

The step of determining the frequency using a deviation from a normal distribution of the measured noise on said symbols received is done by determining the ratio of $$\frac{(E\{x^n\})^{(n-m)}}{E\{x^m\}}$$

where n and m define the higher order moment of the measured noise and wherein x is the measured noise. This ratio predicts a deviation of the normal distribution of the measured noise on said symbols received. Using this ratio as a measure for the deviation the measured noise can be corrected.

Another feature of the present invention is described in claim 5 and claim 10.

The step of determining the frequency using a deviation from a normal distribution of the measured noise on said symbols received is done by determining the ratio $$\text{alpha} = \frac{(E\{x^2\})^2}{E\{x^4\}}$$

wherein x is the measured noise. This ratio predicts a deviation of the normal distribution of the measured noise on said symbols received. Using this ratio as a measure for the deviation the measured noise can be corrected.

It is to be noticed that the term 'comprising', used in the claims, should not be interpreted as being restricted to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled', also used in the claims, should not be interpreted as being restricted to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The above and other objects and features of the invention will become more apparent and the invention itself will be best understood by referring to the following description of an embodiment taken in conjunction with the accompanying drawings wherein.

Figure 2:
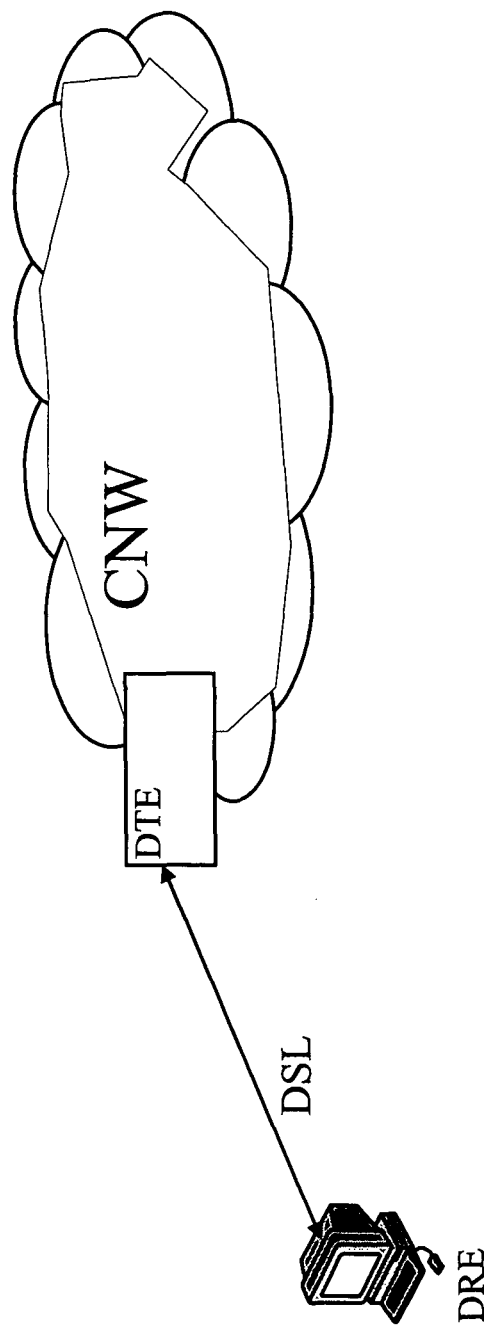
FIG. 2 represents a Digital Subscriber Line communications system.
Figure 3:
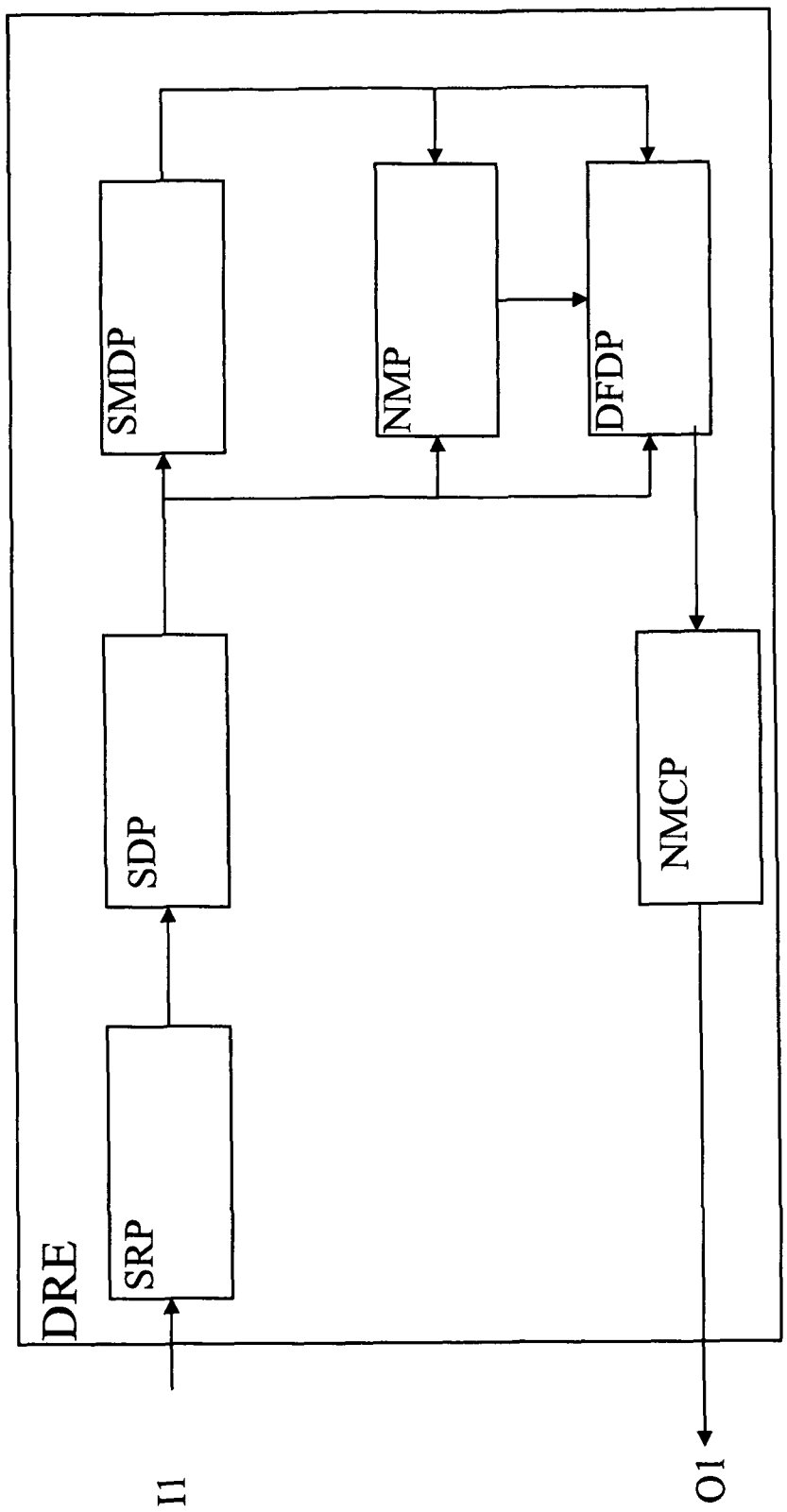
FIG. 3 represents the functional representation of the transmitter DTE and the receiver DRE as presented in FIG. 2.

In the following paragraphs, referring to the drawings, an implementation of the method for noise measurement, the related transmitter and the related receiver according to the present invention will be described. In the first paragraph of this description the main elements of the communications network as presented in FIG. 2 are described. In the second paragraph, all connections between the before mentioned elements and described means are defined. Subsequently all relevant functional means of the mentioned receiver as presented in FIG. 2 are described followed by a description of all interconnections. In the succeeding paragraph the actual execution of the method for noise measurement is described.

The essential elements of the Digital Subscriber Line communications system network of the embodiment according to the present invention are a transmitter DTE, in this embodiment chosen to be a central office and a receiver here chosen to be a user terminal. The transmitter DTE is coupled to a communications network CNW which here is chosen to be the Internet and is coupled to the receiver DRE over a Digital Subscriber Line DSL.

The Digital Subscriber line communications system of the present invention comprises a transmitting Digital Subscriber Line modem DTE for transmitting symbols of a data-signal by modulating each of these symbols on a tone of a plurality of tones of a carrier signal, towards the Receiving Digital Subscriber Line modem DRE and a Receiving Digital Subscriber Line modem DRE for demodulating the transmitted data-signal and retrieving the modulated symbols from the received signal.

In order to keep simplicity in this description it is chosen to only describe one transmitter DTE and one receiver DRE although such a Digital Subscriber Line communications network usually comprises a plurality of transmitters and receivers.

The receiver DRE first comprises a signal receiving part SRP that is adapted to receive the symbols of a data-flow transmitted by a DSL transmitter DTE where these symbols of the data-flow are modulated on tones of a carrier according to an XDSL standard. The Receiving Digital Subscriber Line modem further comprises the following relevant parts: a signal demodulation part SDP that is able to demodulate the received signal and determine the transmitted symbols from the received signal, a symbol demapping part SMDP that is adapted to perform the demapping of said symbol received onto a constellation point S2, a noise measuring part NMP that is adapted to determine the noise on the digital Subscriber line DSL based on the distance between the received symbol R and the determined constellation point S2. Furthermore the Receiving Digital Subscriber Line modem DRE comprises a Deviation frequency determination part DFDP, that is able to determine a frequency of the incorrectly demapped symbols and a Noise measurement correction part NMCP that is adapted to correct the noise determined, using the frequency of the symbols incorrectly demapped.

The Signal reception Part SRP has an input that is at the same time an input-terminal $I_1$ of the receiver DRE. Further, the signal demodulating part SDP is coupled with an input to an output of the signal reception part SRP and the symbol demapping part SMDP is coupled with an input to an output of said signal demodulating part SDP. The noise measuring part NMP is coupled with a first input to an output of the symbol demapping part SMDP and coupled with a second input to an input of the symbol demapping part SMDP. The frequency determination part DFDP is coupled with a first input to an output of the noise measuring part NMP and further coupled with a second input to an input of the noise measuring part NMP. Then, the noise measurement correction part NMCP, is coupled with an input to an output of said deviation Frequency determination part DFDP. Furthermore the deviation Frequency determination part DFDP has an output that is at the same time an output-terminal $O_1$ of the receiver DRE.

In order to explain the present invention it is assumed that a data signal is forwarded from a Digital Subscriber Line transmitting modem DTE towards the Digital Subscriber Line receiving modem DRE. This transmitted signal comprises a series of modulated Quadrature amplitude modulated symbols, which are modulated according to a 4 bits QAM modulation scheme as presented in FIG. 1.

At first the signal reception part SRP of the Receiving Digital Subscriber Line modem DRE receives this analogue data signal carrying the modulated symbols transmitted by the transmitting Digital Subscriber Line modem. The signal reception part SRP converts the received data-signal into a digital output data signal. An analogue part of the signal reception part SRP optionally takes care of filtering, amplification, echo cancellation, etc. The resulting signal is digitised before being optionally filtered, equalised, windowed etc. All of these operations are performed in the time domain. The signal then is passed to the signal demodulating part SDP which will transform the time domain signal into a frequency domain signal (or a coded domain signal in case code division multiple access CDMA is applied). The signal demodulation part SDP demodulates the received data signal and retrieves the transmitted symbols, each representing 4 data-bits, from the demodulated data signal. Then the symbol demapping part SMDP performs the demapping of the received symbols on a constellation point. For instance the transmitted symbol is symbol S1 (FIG. 1) the received symbol R1 is equal to the transmitted symbol plus noise, in this case it is received within the decision area of symbol S2 (see FIG. 1). Next, the symbol demapping part SMDP will apply decision rules (hard-decision rules) to relate the received symbol to the expected sent constellation point. This constellation point corresponds to a series of bit values, hence it is carrying information. The symbol demapping part SMDP, then demaps the received symbol R1 onto the calculated constellation point, which here actually is constellation point S2 (the here described example is valid for hard-decision based rules). Hence, after the demapping process the symbol is received at constellation point S2.

It is to be noted that the symbol demapping part SMDP provides the noise measuring part NMP with the information about the received symbol and the demapped constellation point.

Figure 1:
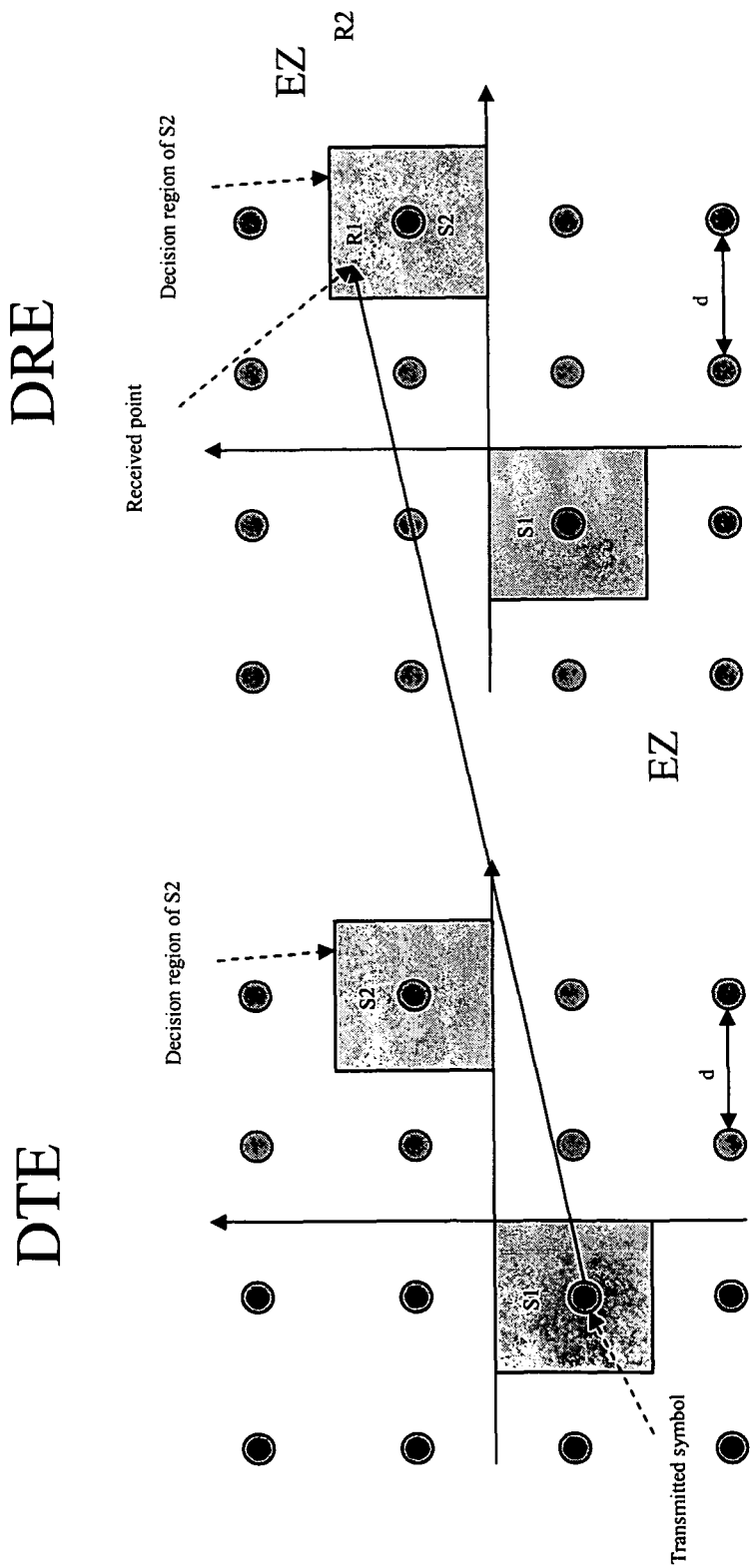
FIG. 1 represents the QAM hard-decision symbol detection.

Then in order to execute the noise measurement, the noise measuring part NMP measures the noise based on the difference between the received symbol R1 and the determined constellation point S2 by applying a metric adapted to compute the difference between the received symbol and the demapped constellation point. This metric gives the measured noise Due to the fact that the received symbol R1 is erroneously demapped onto constellation point S2, the by the receiving modem DRE measured and perceived noise is only the distance between R1 and S2. However the transmitted symbol S1 in case of no noise and errors should have been received at constellation point S1. Hence the real actual noise is represented by the distance between the transmitted symbol S1 and the received symbol R1 as presented in FIG. 1 is substantially larger.

In order to correct this measurement error, the Receiving Digital Subscriber Line modem DRE further comprises a deviation frequency determination part DFDP, which determines a frequency of incorrectly demapped symbols. This deviation frequency determination part DFDP may use a deviation from a normal distribution of the received symbols for determining the frequency of incorrectly demapped symbols, or may use the frequency of using a number of symbols received in the erasure zone. Even a combination of both the deviation of the normal distribution together with the number of symbols received in the erasure zone can be used.

The deviation frequency determining part DFDP computes, based on the data coming from the noise measuring part NMP, the deviation of the measured noise from a normally (gaussian) distributed noise.

During normal operation, the noise measurement error is small such that the measured noise has the characteristics of a gaussian distributed noise. In case of high noise increase, the noise measurement error becomes important and distorts the noise probability distribution function. Therefore, a deviation from the properties of the gaussian distribution can be detected and used to identify a higher noise.

Practically, the following can be done to detect noise measurement errors: for a gaussian distribution, the ratio between the second order moment squared (also known as variance squared) and the fourth order moment is fixed and known. In case noise measurement errors are introduced, the probability density function is not gaussian any more and the above said ratio is not any more equal to the ratio for gaussian distributions and hence indicating noise measurement errors.

The second order moment of a variable x, where x represents the measured noise-level, is computed as the expected value of the squared value of x. In mathematical form it gives $$\sigma^2 = E\{x^2\} = \frac{1}{N}\sum_{i=0}^{N-1} x^2(i)$$

The fourth order moment of a variable x is similarly given by $$E\{x^4\} = \frac{1}{N}\sum_{i=0}^{N-1} x^4(i)$$

The variable N denotes the sequence of symbols for which the second order moment and the fourth order moment are computed.

Another possibility is to detect a deviation from the gaussian distribution at the edges of the decision regions. Indeed, for a gaussian distribution, the probability density function (pdf) decreases closer to the edges. When introducing noise measurement errors due to hard-decision demapping, the measured noise pdf will increase closer to the edges, indicates that noise measurement errors are introduced. It is further to be noted that this example is in fact the same as computing the ratio between the second order moment and the fourth order moment.

At last, another possibility consists of working with erasures. A QAM symbol consists of decision regions and one big region outside the decision regions called the erasure zone. When high noises are present, the received symbol R2 potentially moves outside the decision region, i.e. into the erasure zone EZ. Using the distance between the received point R2 within the erasure zone EZ and the nearest decision point also introduces a noise measurement error. Therefore, this distance has to be multiplied by a weight factor to take into account the probability that the transmitted point was not the nearest point to the received point.

Finally, noise measurement correcting part NMCP takes the output of the deviation frequency determining part DFDP to take actions to correct the noise measurement data to provide more accurate noise measurement data. The noise measurement correcting part NMCP uses as an input the deviation of the noise from the normal distribution, the measured noise and/or the erasure data. The noise measurement correcting part NMCP takes these inputs to decide whether the measured noise is correct or not. If the measured noise is not correct, the noise measurement correcting part NMCP applies a correction based on the deviation of the normally distributed noise and the data related to erasures. The correction based on the deviation of the normally distributed noise can be stored beforehand in a look-up table, where the measured noise has to be multiplied by a correction-factor determined by the deviation of the normal distribution. Such a look-up table is presented in Table 1, $$\text{alpha} = \frac{(E\{x^2\})^2}{E\{x^4\}}$$

If alpha is equal to 0.3339, the noise distribution is Gaussian. When alpha deviates from the aforementioned value, it indicates a deviation from the Gaussian distribution.

Table 1 shows the values of several parameters for a decision region with width equal to 100. Sigma is the theoretical value of the standard deviation of the noise, and as can be seen from the table, the measured standard deviation is very close to the theoretical value. This has been simulated for 100000 symbols. If the theoretical value for the noise standard deviation increases, the measured value deviates more and more from the theoretical value. This is due to demapping errors. Looking at the value of alpha, it shows alpha also deviates from the first entry in the table. Hence, measuring a deviation of alpha, shows a deviation from the Gaussian noise distribution. This deviation can then be corrected.

As an example, let's assume a standard deviation of the noise equal to n_m=20 (units) has been measured over N symbols. Next, the deviation frequency determination part DFDP computes the alpha over the N symbols, which we assume to be equal to 0.5146. This value of alpha means the noise is deviating from a Gaussian distributed noise. Therefore, the real noise can be computed as n_r=n_m*70/54.5957=25.643 (units).

TABLE 1

| Sigma | sqrt(<x^2>) | alpha | Remark |
| --- | --- | --- | --- |
| 2 | 1.9995 | 0.3339 | |
| 6 | 6.0043 | 0.3335 | Normal mode of operation |
| 30 | 30.057 | 0.3385 | |
| 40 | 39.0997 | 0.376 | Begin of deviation |
| 50 | 46.479 | 0.4288 | |
| 60 | 51.479 | 0.478 | |
| 70 | 54.5957 | 0.5146 | |
| 80 | 56.2079 | 0.5347 | |
| 90 | 57.0142 | 0.5468 | |
| 100 | 57.5283 | 0.5516 | |

On the other hand, the noise correction based on erasure data can be done by multiplying the noise distance of the erasure with a weight that is a function of the constellation. Every constellation has a different probability of having received points within the erasure zone in function of the noise. For example, for a 4-QAM as presented in FIG. 1, the probability of receiving a symbol in the exposure zone when the noise increases with 6 dB (this corresponds to a certain alpha), is much higher than the probability of receiving a symbol within the erasure zone with a 12-bit-QAM constellation when the noise increases with 6 dB. Therefore, when an erasure is encountered with a constellation carrying many bits, the measured noise should be multiplied with a weight-factor in function of alpha that is bigger than the weight-factor for a 4-QAM constellation. Therefore, it is possible to build a look-up table comprising different weight factors in function of the constellation size and also in function of alpha. An example of such a look-up table for a well-defined alpha is presented above in TABLE 2.

As explained above, the weights increase with increasing bitloading. The weight for a 4-QAM (i.e. a 2-bit-QAM) is equal to 1.001, while the weight for a 14-bit-QAM is equal to 2.5. If an erasure is encountered for a 4-QAM symbol, the measured noise has to be multiplied with 1.001 (the weight given in table 2), whereas, if an erasure is encountered in a 14-bit-QAM constellation, the measured noise has to be multiplied with the corresponding weight equal to 2.5.

As an example, let's assume an erasure is encountered on a 10-bit-QAM. The measured value of alpha over the N previous samples enables us to pick the right table with the weights to be applied to the erasures. Let's assume additionally that the table defined by the value of alpha corresponds to TABLE 2, the weight to be applied to the erasure distance n (where this erasure distance n=the distance between the measured point in the erasure zone and the closest constellation point) is then $$n_{corrected} = n*1.6$$

This $n_{corrected}$ is then used to update the noise measurement with the latest measured sample.

TABLE 2

| Number of bits loaded on QAM constellation | Weight |
| --- | --- |
| 2 | 1.1 |
| 3 | 1.15 |
| 4 | 1.19 |
| 5 | 1.21 |
| 6 | 1.25 |
| 7 | 1.3 |
| 8 | 1.4 |
| 9 | 1.5 |
| 10 | 1.6 |
| 11 | 1.7 |
| 12 | 1.8 |
| 13 | 1.92 |
| 14 | 2 |

An additional table giving the weights in function of alpha for one constellation size, an 8 QAM constellation size is given by TABLE 3

TABLE 3

| alpha | weight |
| --- | --- |
| 0.3339 | 1 |
| 0.4288 | 1.1 |
| 0.478 | 1.2 |
| 0.5146 | 1.4 |
| 0.5347 | 1.6 |
| 0.5516 | 1.8 |

Then the noise measurement correction part NMCP, corrects the noise measured by the noise measurement part NMP, using the frequency of the symbols incorrectly demapped.

It can be determined beforehand, what frequency of incorrectly demapped symbols corresponds to what overall absolute noise amplitude. Therefore, a look-up table can be implemented to provide the real noise as output for some given demapping error frequency.

The noise measurement correction part NMCP may forward the corrected noise level towards the transmitting Digital Subscriber Line modem TMM that may use this corrected noise level for adapting the transmit power.

It is further to be noted that although 4 bits-QAM is used any other scheme may be use alternatively.

It is also to be noted that although the previously described embodiments are an implementation of hard-decision based rules, the present invention can be implemented evenly suitable using soft-decision based rules.

It is additionally to be noted that although only an embodiment describing QAM is elucidated, alternatively the present invention may additionally be applied in a Pulse Amplitude Modulation scheme as used in Symmetric High-bitrate Digital Subscriber Line or in any mobile analogous modulation.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A noise measurement method for noise measurement in a transmission Digital Subscriber Line system, said system comprising a transmitting Digital Subscriber Line modem and a receiving Digital Subscriber Line modem, said transmitting Digital Subscriber Line modem being coupled over a communication line to said receiving Digital Subscriber Line modem, the method comprising:

receiving a symbol, at said receiving Digital Subscriber Line modem, transmitted by said transmitting Digital Subscriber Line modem;

demapping, at said receiving Digital Subscriber Line modem, said symbol received on a constellation point;

performing, at said receiving Digital Subscriber Line modem, the noise measurement based on the difference between the received symbol and the constellation point;

determining, at said receiving Digital Subscriber Line modem, a frequency of symbols incorrectly demapped; and correcting, at said receiving Digital Subscriber Line modem, said noise measurement using said frequency of said symbols incorrectly demapped.

2. The noise measurement method according to claim 1, wherein said frequency determining step determines said frequency based on determining a number of symbols received in an erasure zone.

3. The noise measurement method according to claim 1, wherein said frequency determining step determines said frequency based on said receiving Digital Subscriber Line modem determining a deviation from a normal distribution of the measured noise on symbols received.

4. The noise measurement method according to claim 3, wherein said frequency determining step determines said deviation from a normal distribution of the measured noise on received symbols by determining the ratio of $$\frac{(E\{x^n\})^{(n-m)}}{E\{x^m\}}$$

where
x=the measured noise, and n and m define a higher order moment.

5. The noise measurement method according to claim 3, wherein said frequency determining step determines said deviation from a normal distribution of the measured noise on received symbols by determining the ratio $$alpha = \frac{(E\{x^2\})^2}{E\{x^4\}}$$

where
x=the measured noise.

6. A receiving Digital Subscriber Line modem for use in a noise measurement in a transmission Digital Subscriber Line system, said system comprising a transmitting Digital Subscriber Line modem and said receiving Digital Subscriber Line modem, said transmitting Digital Subscriber Line modem being coupled over a communication line to said receiving Digital Subscriber Line modem, said receiving Digital Subscriber Line modem comprising:

a signal reception part configured to receive a symbol transmitted by said transmitting Digital Subscriber Line modem;

a symbol demapping part, coupled to an output of said signal reception part and configured to perform the demapping of said symbol received on a constellation point;

a noise measuring part, coupled to the output of said signal reception part, coupled to an output of said symbol demapping part, and configured to measure said noise measurement based on the difference between said received symbol and said constellation point;

a deviation frequency determination part, coupled to the output of said signal reception part, coupled to the output of said symbol demapping part, coupled to an output of said noise measuring part, and configured to determine a frequency of symbols incorrectly demapped; and a noise measurement correction part, coupled to an output of said deviation frequency determination part and configured to correct said noise measurement, using said frequency of said symbols incorrectly demapped.

7. The receiving Digital Subscriber Line modem according to claim 6, wherein said deviation frequency determination part is further configured to determine said frequency using a number of symbols received in an erasure zone.

8. The receiving Digital Subscriber Line modem according to claim 6, wherein said deviation frequency determination part is further configured to determine said frequency using a deviation from a normal distribution of the measured noise on symbols received.

9. The receiving Digital Subscriber Line modem according to claim 6, wherein said deviation frequency determination part is further configured to determine said frequency using a deviation from a normal distribution of the measured noise on symbols received by determining the ratio of $$\frac{(E\{x^n\})^{(n-m)}}{E\{x^m\}}$$

where
x=the measured noise, and n and m define a higher order moment.

10. The receiving Digital Subscriber Line modem according to claim 6, wherein said deviation frequency determination part is further configured to determine said frequency using a deviation from a normal distribution of the measured noise on symbols received by determining the ratio $$alpha = \frac{(E\{x^2\})^2}{E\{x^4\}}.$$

wherein
x=the measured noise.

* * * * *